(12) United States Patent
Misu et al.

(10) Patent No.: US 7,438,988 B2
(45) Date of Patent: Oct. 21, 2008

(54) RECHARGEABLE BATTERY WITH SURFACE MOUNTED TEMPERATURE DETECTOR

(75) Inventors: Masahiro Misu, Kosai (JP); Toyohiko Eto, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 116 days.

(21) Appl. No.: 11/267,102

(22) Filed: Nov. 7, 2005

(65) Prior Publication Data

US 2006/0103346 A1    May 18, 2006

(30) Foreign Application Priority Data

Nov. 12, 2004    (JP) .............. 2004-329274

(51) Int. Cl.
*H01M 2/10* (2006.01)
*H01M 2/18* (2006.01)
*H01M 6/42* (2006.01)
*H01M 6/46* (2006.01)
*H01M 6/04* (2006.01)
*H01M 6/02* (2006.01)
*H02J 7/00* (2006.01)
*H02J 7/04* (2006.01)

(52) U.S. Cl. .................. 429/98; 320/107; 320/112; 320/150; 320/154; 429/96; 429/97; 429/99; 429/100; 429/138; 429/148; 429/149; 429/151; 429/152; 429/153; 429/154; 429/163; 429/176; 429/177; 429/178

(58) Field of Classification Search .......... 320/150, 320/107, 112, 154; 429/9, 96–100, 138, 429/148–149, 151–154, 163, 175–178, 186
See application file for complete search history.

(56) References Cited

U.S. PATENT DOCUMENTS

2004/0191619 A1* 9/2004 Komori et al. .............. 439/176

FOREIGN PATENT DOCUMENTS

| EP | 1 069 629 | 1/2001 |
|---|---|---|
| JP | 2001-035547 | 2/2001 |
| JP | 3175558 | 4/2001 |

* cited by examiner

*Primary Examiner*—Akm Enayet Ullah
*Assistant Examiner*—Richard V Muralidar
(74) *Attorney, Agent, or Firm*—Finnegan, Henderson, Farabow, Garrett & Dunner, LLP.

(57) ABSTRACT

Secondary battery structure 100 has secondary batteries 110 equipped with metallic battery cases 111, temperature detectors 120 for detecting temperature of the secondary batteries 110, and supporting members 130 for supporting the temperature detectors 120. Each of the temperature detectors 120 has a detector body 121 which detects surface temperature of the battery case 111 by contacting with a bottom surface 111*c* (temperature-detected surface) on the battery case 111, and a fixing portion 122 which engages with the supporting member 130 and fixes the temperature detector 120 to the secondary battery 110 while keeping the detector body 121 contact with the bottom surface 111*c* on the battery case 111.

6 Claims, 8 Drawing Sheets

RECHARGEABLE BATTERY WITH SURFACE MOUNTED TEMPERATURE DETECTOR

CROSS-REFERENCE TO RELATED APPLICATIONS

This application is based upon and claims the benefit of priority from each of the prior Japanese Patent Application No. 2004-329274 filed on Nov. 12, 2004, the entire contents of which are incorporated herein by reference.

BACKGROUND OF THE INVENTION

1. Field of the Invention

The present invention relates to secondary battery structure equipped with a secondary battery/batteries and a temperature detector(s) for detecting temperature of the battery/batteries.

2. Description of Related Art

There have conventionally been proposed various secondary batteries as power for portable electric appliances, cellular phones, electric cars, hybrid cars, and the like. Temperature of such proposed secondary batteries goes up high along heating caused by charging/discharging. Especially, in case they are used as power for electric cars, hybrid cars, and the like, temperature of secondary batteries tends to go up considerably high because huge current flows, which is problematic.

To resolve such problems, there has been developed technology to control temperature of secondary batteries. For controlling temperature of secondary batteries appropriately, it is required to detect temperature of secondary batteries appropriately. To meet the requirement, there has recently been developed various technology to detect temperature of secondary battery appropriately.

For example, both JP Patent No. 3175558 and JP Unexamined Patent Publication No. 2001-35547 disclose structure such that a cylinder-hollow-shaped temperature detecting hole is provided on a resin battery jar (battery case) and a temperature detector is inserted in the temperature detecting hole. Thus arranged temperature detector makes it possible to detect temperature of secondary batteries appropriately.

By the way, secondary batteries with a metallic battery case(s) have recently been in the spotlighted as power for, especially, electric cars, hybrid cars, and the like. That is, a battery case made of metal can enhance battery's heat radiation ability, whereby a rise of battery temperature can be restrained. The batteries with a metal case(s) are also required to detect battery temperature appropriately. However, what disclosed in both JP Patent No. 3175558 and JP Unexamined Patent Publication No. 2001-35547 is technology to detect temperature of secondary batteries with a resin case(s) appropriately, however, it is not applicable to batteries with a metallic case(s).

SUMMARY OF THE INVENTION

The present invention has been made in view of the above circumstances and has an object to overcome the above problems and to provide secondary battery structure which makes it possible to detect temperature of secondary batteries with a metallic case(s) appropriately.

According to a first aspect of the present invention, there is provided secondary battery structure comprising: a secondary battery with a metallic battery case; a temperature detector for detecting temperature of the secondary battery; and a supporting member for supporting the temperature detector; wherein the temperature detector includes: a detector body for detecting surface temperature of the battery case by contacting with a temperature-detected surface on a surface of the battery case; and a fixing portion for fixing the temperature detector to the secondary battery, the fixing portion engaging with the supporting member to keep the detector body contact with the temperature-detected surface.

The inventive secondary battery structure has a secondary battery, a temperature detector for detecting temperature of the secondary battery, and a supporting member for supporting the temperature detector.

The temperature detector includes a detector body for detecting surface temperature of the battery case by contacting with a surface (temperature-detected surface) of the battery case, and a fixing portion for fixing the temperature detector to the secondary battery while engaging with the supporting member to keep the detector body contact with the temperature-detected surface. Thereby, the detector body of the temperature detector can be made to contact with the surface (temperature-detected surface) of the battery case appropriately and the contact state can be kept. Thereby, surface temperature of the battery case can be detected appropriately.

It is to be noted that the inventive secondary battery structure is not restricted to unit cell structure but inclusive of battery pack structure consisting of single or plural battery row(s) each of which is constituted by connecting plural secondary batteries. In case of battery pack structure, the structure may be designed to detect temperature of each secondary battery (unit cell) of the battery pack or to only detect temperature of a secondary battery/batteries randomly selected among them. Furthermore, the number of portions subject to temperature detection may not be restricted to one but plural portions may be acceptable with respect to a single secondary battery (unit cell).

Furthermore, as to the inventive secondary battery structure, it is preferable that the fixing portion of the temperature detector is elastically deformable, and the detector body elastically contacts and presses a surface of the battery case with aid of elastic memory of the fixing portion which engages with the supporting member in a elastically deformed state.

In the inventive secondary battery structure, the detector body elastically contacts and presses the surface of the battery case with the aid of elastic memory of the fixing portion which engages with the supporting member in a elastically deformed state. With such structure, even though there arises relative location departure among the secondary battery, supporting member and temperature detector (more specifically, engagement location departure between the supporting member and the fixing portion of the temperature detector) due to metrication error of respective members and the like, location departure can be absorbed thanks to elastic deformation of the fixing portion. Thereby, the problem that the detector body of the temperature detector is hard to contact with the surface of the battery case due to metrication error of respective members and the like can be minimized significantly.

Furthermore, under the condition that the secondary battery structure is likely to have vibration, the secondary battery sometimes vibrates in a direction orthogonal to the temperature-detected surface of the battery case (direction where a distance to the detector body changes). Even in such a case, the inventive secondary battery structure can keep the detector body contact with the surface of the battery case. Therefore, even under the likely-to-vibrate condition, surface temperature of the battery case can be detected appropriately.

Furthermore, as to the inventive secondary battery structure, it is preferable that the supporting member has a supporting-member-side engaging portion which engages with the fixing portion of the temperature detector, and the fixing portion of the temperature detector includes: a fixing-portion-side engaging portion which engages with the supporting-member-side engaging portion; and a linking portion which links the fixing-portion-side engaging portion and the detector body, and is elastically deformable in at least two directions, namely, a direction orthogonal to the temperature-detected surface of the battery case, and a direction that links the fixing-portion-side engaging portion and the detector body among directions along the temperature-detected surface.

In the inventive secondary battery structure, the linking portion, a part of the fixing portion of the temperature detector, that links the fixing-portion-side engaging portion and the detector body is elastically deformable in at least a direction that links the fixing-portion-side engaging portion and the detector body out of a direction orthogonal to the temperature-detected surface of the battery case and a direction along the temperature-detected surface. Therefore, even though there occurs relative location departure among the secondary battery, the supporting member and the temperature detector due to metrication error of respective members and the like, location departure can be absorbed thanks to elastic deformation of the linking portion.

More specifically, for example, even if there occurs metrication error between the temperature-detected surface of the battery case and the supporting-member-side engaging portion (distance of direction orthogonal to the temperature-detected surface), the liking portion elastically deforms in a direction orthogonal to the temperature-detected surface of the battery case so that the metrication error can be absorbed. Furthermore, even though there occurs metrication error between the fixed-portion-side engaging portion and the detector body (distance along the temperature-detected surface), the linking portion elastically deforms in a direction that links the fixing-portion-side engaging portion and the detected body among directions along the temperature-detected surface so that the metrication error can be absorbed.

Accordingly, the inventive secondary battery structure can make the detector body of the temperature detector contact with the temperature-detected surface of the battery case appropriately without being affected by relative location departure among the secondary battery, the supporting member, and the temperature detector due to metrication error of respective members and the like.

Furthermore, as to the inventive secondary battery structure, it is preferable that the temperature detector engages with the supporting member at the fixing portion with being removable from the supporting member and the secondary battery.

In case the temperature detector is unremovably fixed to the secondary battery, the temperature detector must be disposed together with a dead battery when a battery in dead due to end of battery life and the like is replaced with a new one. Furthermore, the temperature detector and wirings extending from there can possibly be obstacle to maintenance operation.

On the other hand, in the inventive secondary battery structure, the temperature detector is attached removably. Therefore, the temperature detector is never disposed together with a dead battery and can be used with a newly replaced battery. Furthermore, maintenance operation can go preferably by removing the temperature detector.

Furthermore, as to the inventive secondary battery structure, it is preferable that the detector body of the temperature detector includes: a temperature detecting element for detecting temperature; a surrounding portion for surrounding the temperature detecting element, the surrounding portion being pillar shaped; and plural protruding wall portions for preventing air from circulating along a surface of the surrounding portion, the protruding wall portions protruding radially from the surrounding portion to outward.

As method for controlling temperature of secondary battery structure (secondary battery), there is method of sending cooling wind to a secondary battery based on temperature detected by a temperature detector so as to prevent battery temperature from going up, for example. In that case, for detecting battery temperature appropriately by the temperature detector, it is preferable that surrounding of a temperature detecting element integrated in the temperature detector is surrounded by a member made of resin and the like which is excellent in thermal insulation ability so that the temperature detecting element should not be cooled down by cooling wind. However, as volume of a surrounding portion which surrounds the temperature detecting element is made larger so as to prevent the temperature detecting element from being cooled down by cooling wind, calorific capacity of the surrounding portion becomes larger. As a result, temperature of second battery's temperature detected surface is not transmitted to the temperature detecting element immediately. That is, battery's temperature change is not detected immediately.

On the other hand, the inventive secondary battery structure includes a pillar-shaped surrounding portion for surrounding the temperature detecting element, and plural protruding wall portions for preventing air from circulating along a surface of the surrounding portion wherein the protruding wall portions protrude radially from the surrounding portion to outward. With such structure, since air stagnation is created at a space surrounded by the surrounding portion and the protruding wall portions, approach of cooling wind to the temperature detecting element can be prevented as successfully as the case that entirety of the temperature detecting element's surrounding is made pillar shaped. Furthermore, since volume of the members can be made small in comparison with the case that entirety of the temperature detecting element's surrounding is made pillar shaped, calorific capacity can be made small. Therefore, the inventive secondary battery structure can detect surface temperature of a secondary battery appropriately and immediately.

Furthermore, as to the inventive secondary battery structure, it is preferable that the detector body of the temperature detector has a contact surface which contacts the temperature-detected surface of the battery case, and the contact surface includes: a temperature detecting region inclusive of the temperature detecting element inside of a virtual tube region which corresponds to what the temperature detecting region is extended in a direction orthogonal to the contact surface; and plural protruding regions which protrude and extend radially from the temperature detecting region.

As to the inventive secondary battery structure, in the detector body of the temperature detector, the contact surface in contact with the temperature-detected surface of the battery case has a temperature detecting region and plural protruding regions which protrude and extend radially from the temperature detecting region. With such structure, since the problem of the temperature detector's slanting can be lessened at least in plural directions where protruding regions extend, ground stability (stability to the temperature-detected surface of the battery case) can be improved and the temperature detecting region can be made to contact with the temperature-detected surface stably. Furthermore, since the contact area can be made smaller in comparison with a case that a ring region for surrounding entire periphery of the temperature detecting region is provided (enlarge the temperature detecting region in similar way) so as to make ground stability preferable, ground pressure (pressure of the battery case to the temperature-detected surface) can be made large. Therefore, the inventive secondary battery structure can detect surface temperature of the secondary battery preferably.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
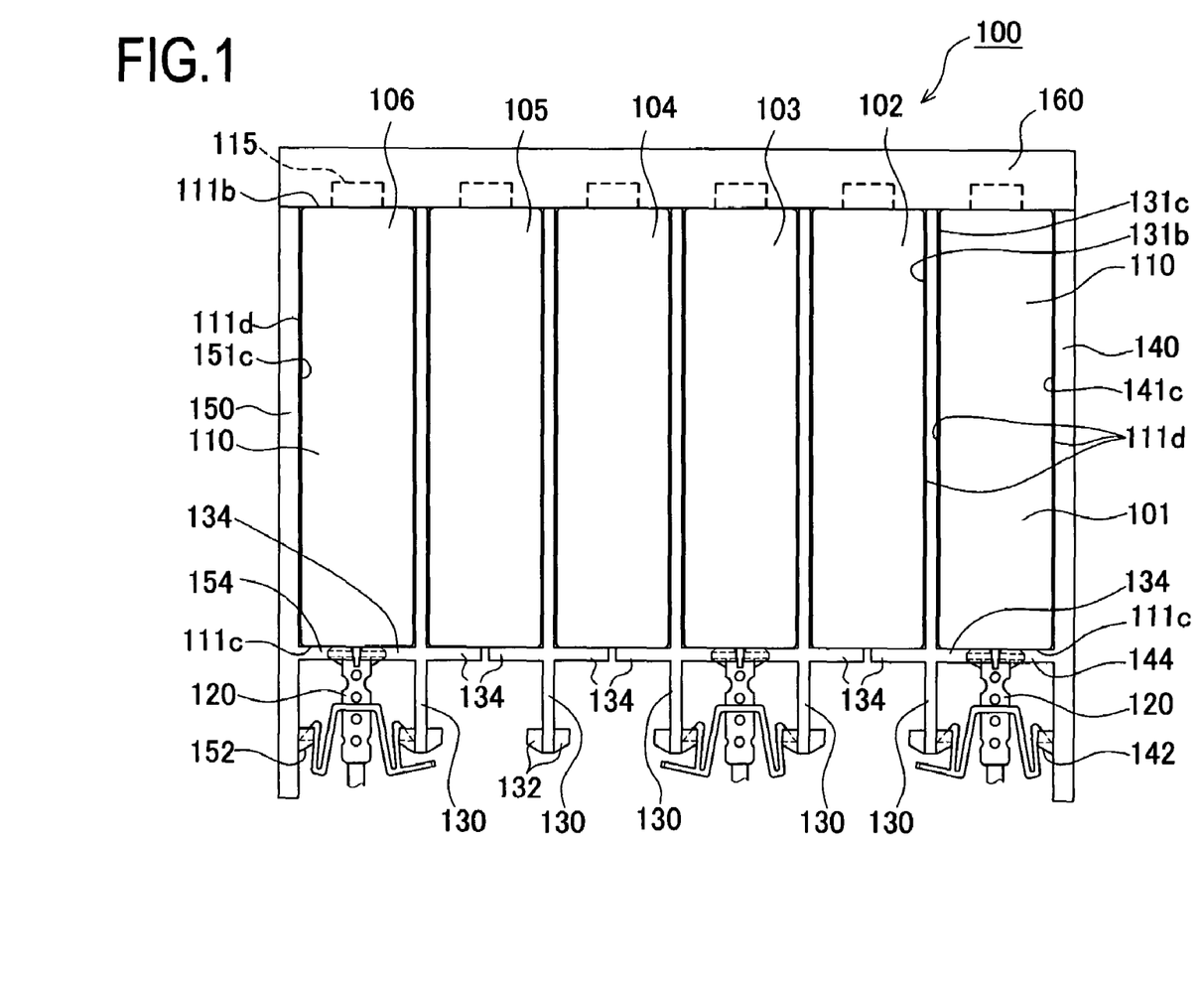
FIG. 1 is a side view of secondary battery structure 100 directed to the present embodiment.
Figure 2:
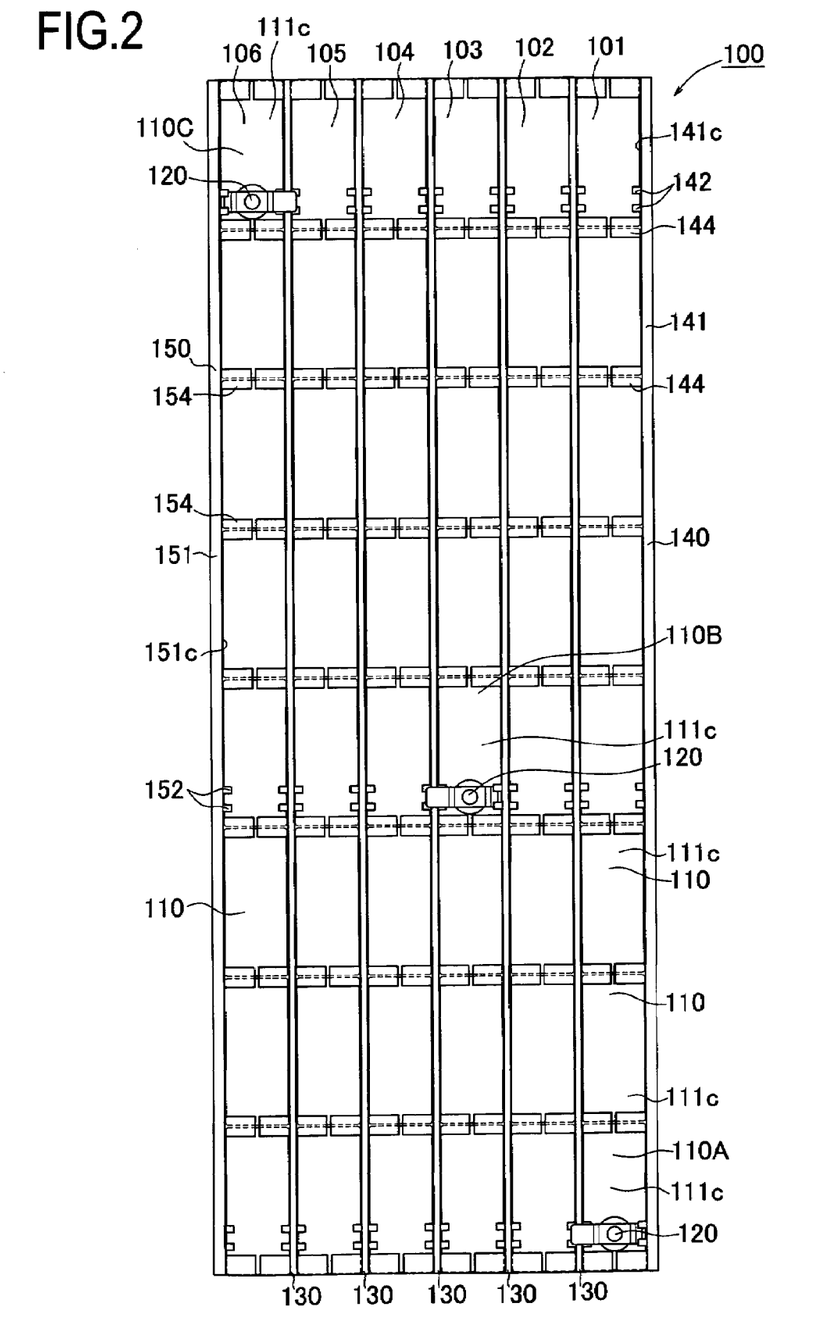
FIG. 2 is a bottom view of the secondary battery structure 100 directed to the present embodiment.

A detailed description of a preferred embodiment of the inventive secondary battery structure will be described by referring to the accompanying drawings. FIG. 1 is a side view of secondary battery structure 100 directed to the present embodiment and FIG. 2 is a bottom view of it. As shown in FIG. 1 and FIG. 2, the secondary battery structure 100 directed to the present embodiment has secondary batteries 110, temperature detectors 120, supporting members 130, 140, and 150, and a lid member 160.

Figure 3:
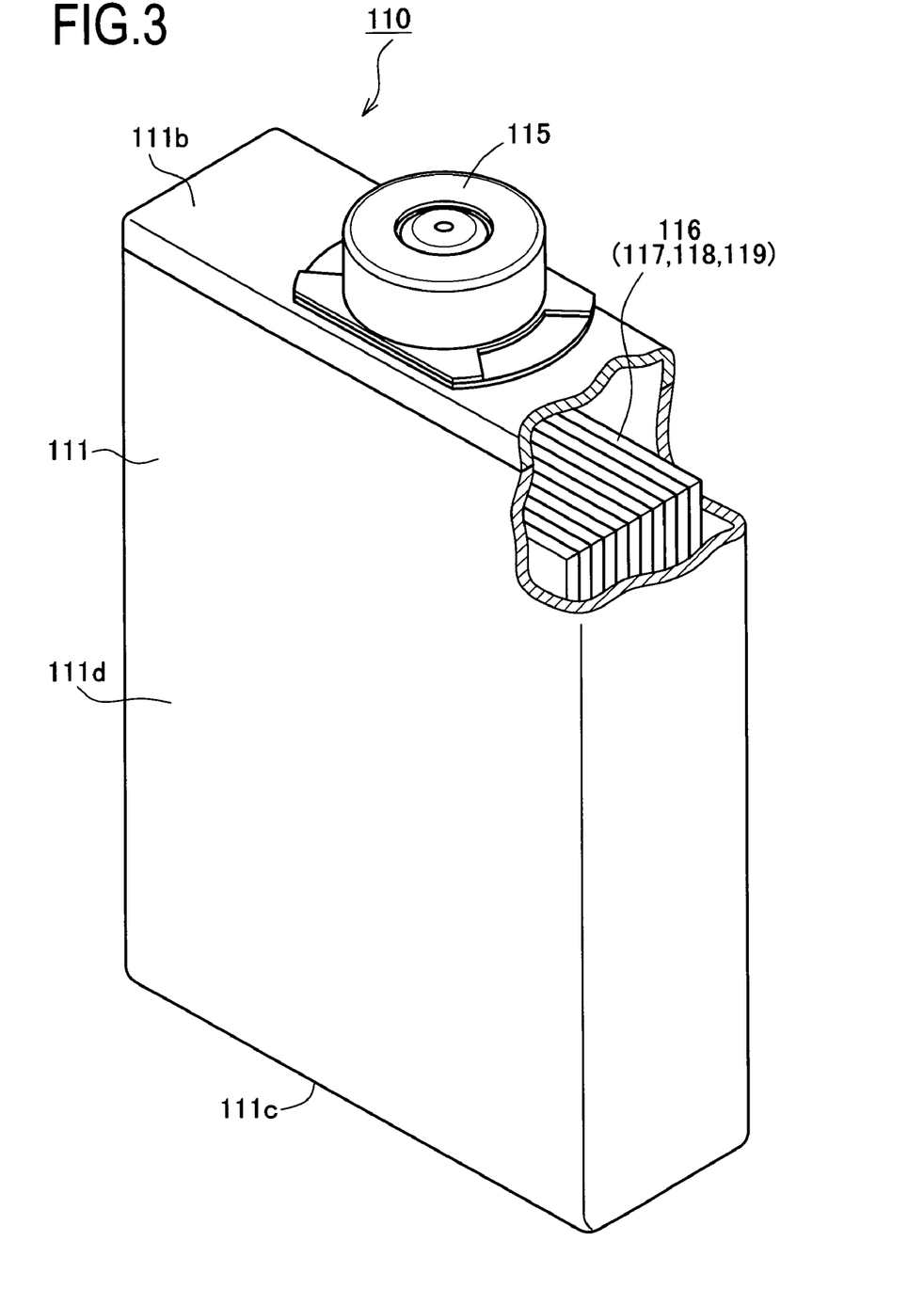
FIG. 3 is a partial exploded perspective view of a secondary battery 110.

As shown in FIG. 3, a secondary battery 110 is a rectangular-sealed-type nickel hydride secondary battery which consists of a metallic (specifically, nickel-coated sheet steel) battery case 111, a safety valve 115, polar plate group 116 arranged inside of the battery case 111, and electrolytic solution (not shown). The polar plate group 116 has positive poles 117, negative poles 118, and pouched separators 119. The positive poles 117 are inserted in the pouched separators 119, and the positive poles 117 inserted in the pouched separators 119 and the negative poles 118 are alternately laminated. The positive poles 117 and the negative poles 118 are separately collected and connected to a positive polar terminal and a negative polar terminal (both not shown), respectively.

As a positive pole 117, an electrode plate consisting of active material inclusive of nickel hydroxide and active material supporting body such as foam nickel, for example, can be used. As a negative pole 118, an electrode plate inclusive of hydrogen storing alloy as negative polar constituent material, for example, can be used. As a separator 119, non-woven fabric consisting of hydrophilization-treated synthetic fiber, for example, can be used. As electrolytic solution, ratio 1.2-1.4 of alkali solution including KOH, for example, can be used.

As shown in FIG. 2, in the present embodiment, there are formed six battery modules 101 through 106 each of which constituted by connecting eight secondary batteries 110 in series. Furthermore, the six battery modules 101 through 106 are connected in series by not shown connection terminal, thereby to organize a battery pack. Accordingly, in the secondary battery structure 100 of the present embodiment, forty-eight secondary batteries 110 are connected in series.

The lid member 160 is made of resin, box-like shaped, and arranged on top surfaces 111b of the battery modules 101 through 106 (the secondary batteries 110) to surround each safety valve 115 of the secondary batteries 110. Although not shown, gas passage is formed inside the lid member 160. Therefore, in case a safety valve 115 works and gas (hydrogen gas and the like) is discharged from a secondary battery 110, the gas (hydrogen gas and the like) can be discharged through the gas passage inside of the lid member 160.

Figures 6A, 6B, 6C:
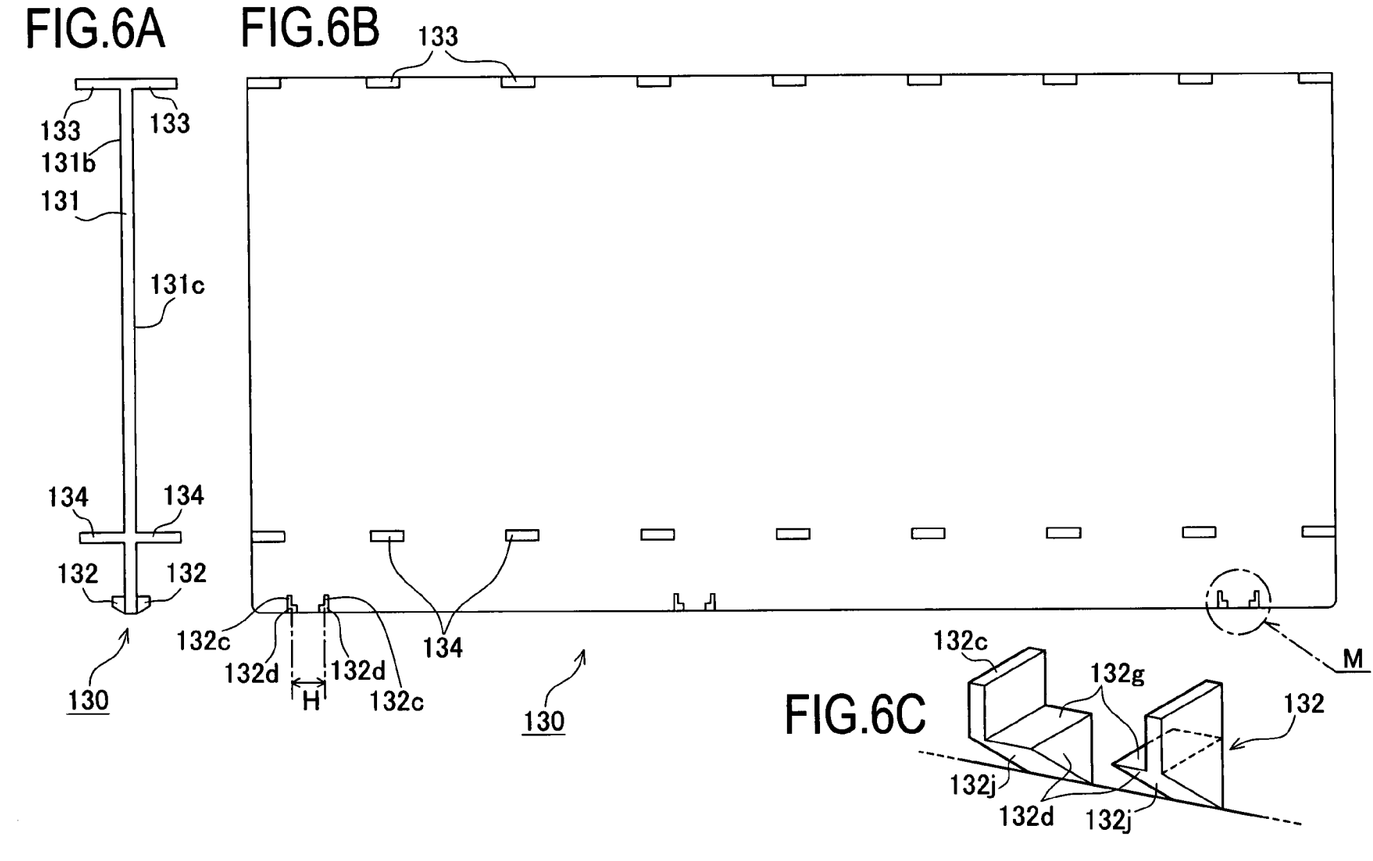
FIG. 6A is a front view of a supporting member 130.
FIG. 6B is a side view of the supporting member 130.
FIG. 6C is a magnified perspective view of a portion M shown in FIG. 6B.

The supporting member 130 is made of resin and has a substantially rectangular-flat-plate-like main body portion 131, a supporting-member-side engaging portions 132 protruding from both a front surface 131b and a reverse surface 131c on the main body portion 131, and a first positioning portion 133 and a second positioning portion 134 both protruding from the front surface 131b and the reverse surface 131c in plate's thickness direction, as shown in FIG. 6A, FIG. 6B, and FIG. 6C.

As shown in FIG. 6C, a supporting-member-side engaging portion 132 has a pair of flat plate portions 132c arranged at a bottom end of a main body portion 131 taking a predetermined space, and a pair of step portions 132d arranged at the side of the pair of flat plate portions 132c in contact with those flat plate portions 132c to form a step. Such structured supporting-member-side engaging portions 132 are arranged at three portions on the side of the front surface 131b with respect to the bottom end of the main body portion 131 and at same three portions on the side of the reverse surface 131c with respect to plate's thickness direction of the main body portion 131.

Furthermore, as shown in FIG. 6A and FIG. 6B, each of the first positioning portions 133 is a rectangular-flat-plate-like shape vertically protruding and extending from the main body portion 131. Nine first positioning portions 133 are formed on the front surface 131b and the reverse surface 131c of the main body portion 131 at its top end with equally spaced apart. Furthermore, each of the second positioning portions 134 is also a rectangular-flat-plate-like shape vertically protruding and extending from the main body portion 131. Nine second positioning portions 134 are formed on the front surface 131b and the reverse surface 131c of the main body portion 131 at slightly above of the bottom end of the main body 131 with equally spaced apart. The first positioning portions 133 and the second positioning portions 134 are arranged with taking space substantially coinciding with height of the secondary battery 110 (distance between the top surface 111b and the bottom surface 111c of the secondary battery 110 shown in FIG. 3).

The supporting member 140 is made of resin. As shown in FIG. 1 and FIG. 2, the supporting member 140 has a supporting-member-side engaging portion 142, a second positioning portion 144 and a not-shown first positioning portion only at the reverse surface 141c side on the rectangular-flat-plate-like shaped main body portion 141, different from the supporting member 130. The supporting-member-side engaging portion 142 has a shape same as the supporting-member-side engaging portion 132 for the supporting member 130. Furthermore, the second positioning portion 144 and the not-shown first positioning portion have shapes same as the second positioning portion 134 and the first positioning portion 133 for the supporting member 130, respectively.

The supporting member 150 is also made of resin. As shown in FIG. 1 and FIG. 2, the supporting member 150 has a supporting-member-side engaging portion 152, a second positioning portion 154 and a not-shown first positioning portion only at the reverse surface 151c side of the rectangular-flat-plate-like shaped main body portion 151. The supporting-member-side engaging portion 152 has a shape same as the supporting-member-side engaging portion 132 for the supporting member 130. Furthermore, the second positioning portion 154 and the not-shown first positioning portion have shapes same as the second positioning portion 134 and the first positioning portion 133 for the supporting member 130, respectively.

As shown in FIG. 1 and FIG. 2, the supporting members 130, 140, and 150 are arranged side by side with the battery modules 101 through 106 alternately in thickness direction of the secondary battery 110 (left-and-right direction in the figures). More specifically, the supporting member 140 is arranged outside of the battery module 101 (right side in the figure), the supporting members 130 are arranged between adjoining battery modules among the battery modules 101 through 106, the supporting members 150 is arranged outside of the battery module 106 (left side in the figure).

The supporting member 140 makes the second positioning portions 144 contact with the bottom surfaces 111c on the secondary batteries 110 belonging to the battery module 101 and also makes the not-shown first positioning portions contact with the top surfaces 111b on the secondary batteries 110. The supporting members 130 make the second positioning portions 134 contact with the bottom surfaces 111c on the secondary batteries 110 belonging to the battery modules 101 through 106 and, although not shown, also make the first positioning portions 133 contact with the top surfaces 111b on the secondary batteries 110. The supporting member 150 makes the second positioning portions 154 contact with the bottom surfaces 111c on the secondary batteries 110 belonging to the battery module 106 and also makes the not-shown first positioning portions contact with the top surfaces 111b on the secondary batteries 110. Thereby, the secondary batteries 110 respectively belonging to the battery modules 101 through 106 are positioned in theirs height direction (up-and-down direction in FIG. 1).

Furthermore, the supporting member 140 makes the reverse surface 141c of the main body portion 141 contact with the side surfaces 111d of the secondary batteries 110 belonging to the battery module 101. The supporting members 130 make the top surface 131b and the reverse surface 131c on the main body portion 131 contact with side surfaces 111d of the secondary batteries 110 respectively belonging to battery modules 101 through 106, and intervene between adjoining battery modules among the battery modules 101 through 106. The supporting member 150 makes the reverse surface 151c on the main body portions 151 contact with the side surfaces 111d of the secondary batteries 110 belonging to the battery module 106. Thereby, the battery modules 101 through 106 are positioned in theirs thickness direction (left-and-right direction in FIG. 1).

As described in the above, by combining the supporting members 130, 140, and 150 with the battery modules 101 through 106, positioning of the supporting-member-side engaging portions 132, 142, and 152 for the supporting members 130, 140, and 150, respectively, can be made with reference to the bottom surfaces 111c (temperature-detected surface) on the secondary batteries 110 which constitute the battery modules 101 through 106. Furthermore, by making the supporting members 130 intervene between adjoining battery modules among the battery modules 101 through 106, adjoining battery modules (secondary batteries 110) can be insulated at respective side surfaces 111d.

Figure 4A:
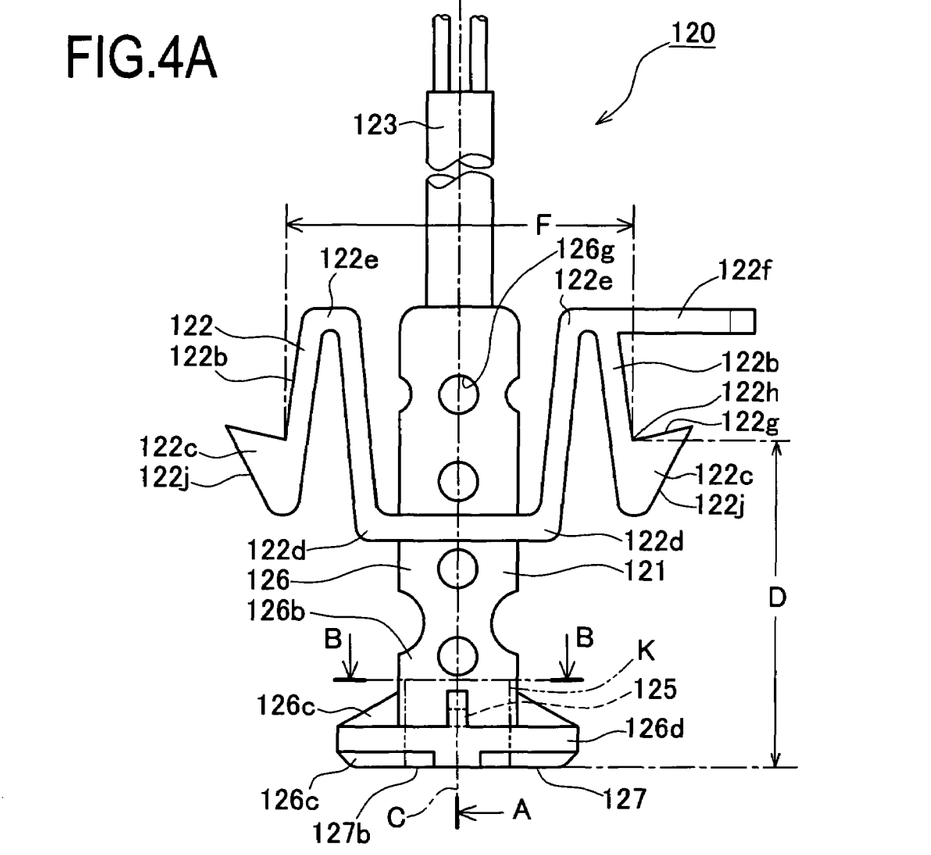
FIG. 4A is a front view of a temperature detector 120.
Figure 5:
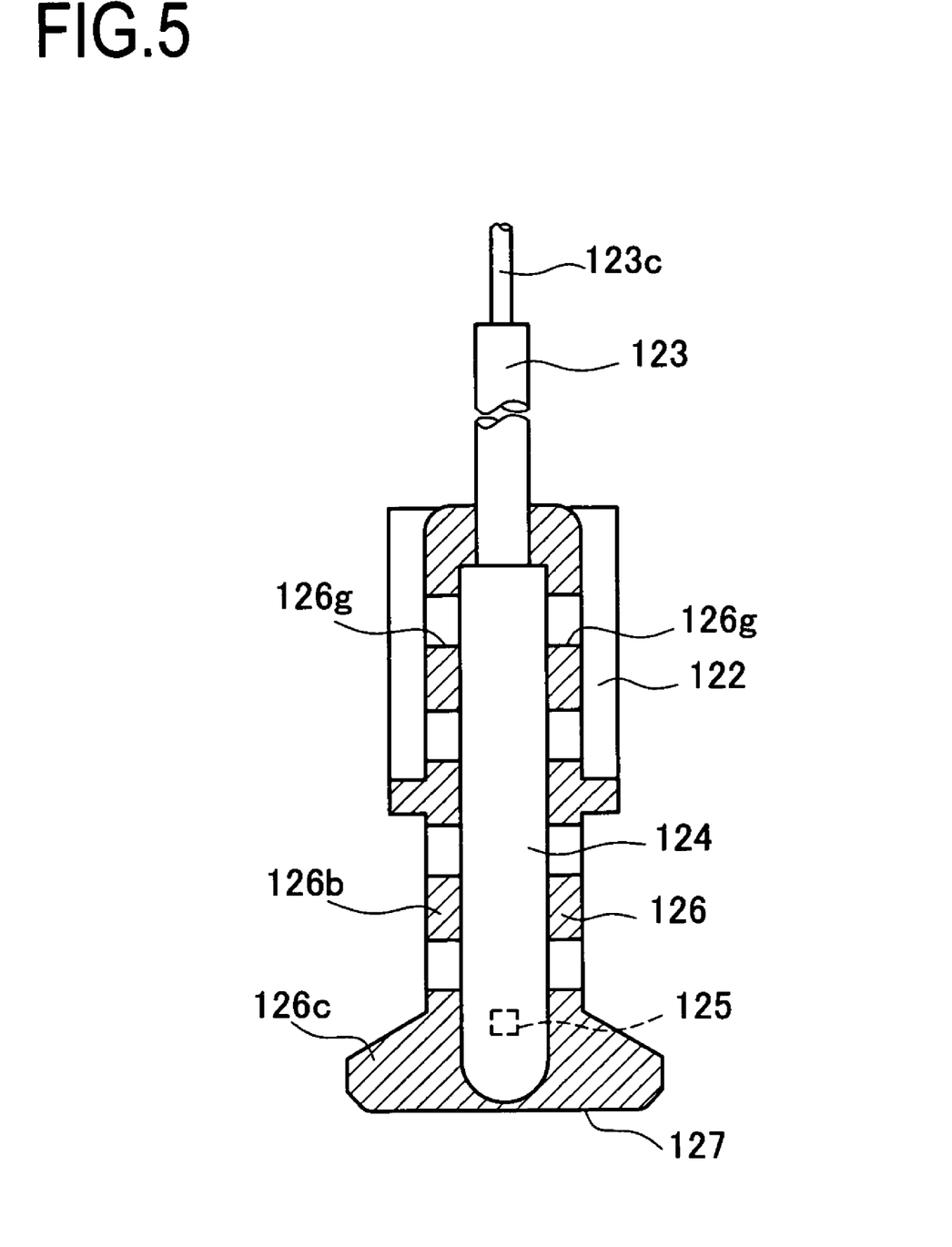
FIG. 5 is a cross-sectional view of an arrow A-A section shown in FIG. 4A.

Next, there will be described the temperature detectors 120 which are attached to the supporting members 130, 140, and 150 so as to detect temperature of the secondary batteries 110. The temperature detector 120 has a substantially cylindrical-shaped detector body 121, and a fixing portion 122 which curve-wise extends from center of axial line C of the detector body 121 toward symmetrically radius direction sides by 180 degrees (left-and-right direction) and forms a substantially M-like shape looked from front, as shown in FIG. 4A. As the partial cross-sectional view of FIG. 5 shows, the detector body 121 has a temperature detecting element 125 (indicated with broken lines) arranged on central axis C at its top end, a lead 123 which connects the temperature detecting element 125 via a conductor 123c (indication is left out in the figure), coating resin 124 for coating the temperature detecting element 125 and the lead 123, and a surrounding body 126 for surrounding the coating resin 124.

As to the temperature detector 120 of the present embodiment, the surrounding body 126 and the fixing portion 122 are formed in a single piece with resin. More specifically, the surrounding body 126 and the fixing portion 122 are formed in a single piece around what the temperature detecting element 125 and the lead 123 are coated with the coating resin 124 by insert-shape-forming method.

Figure 4B:
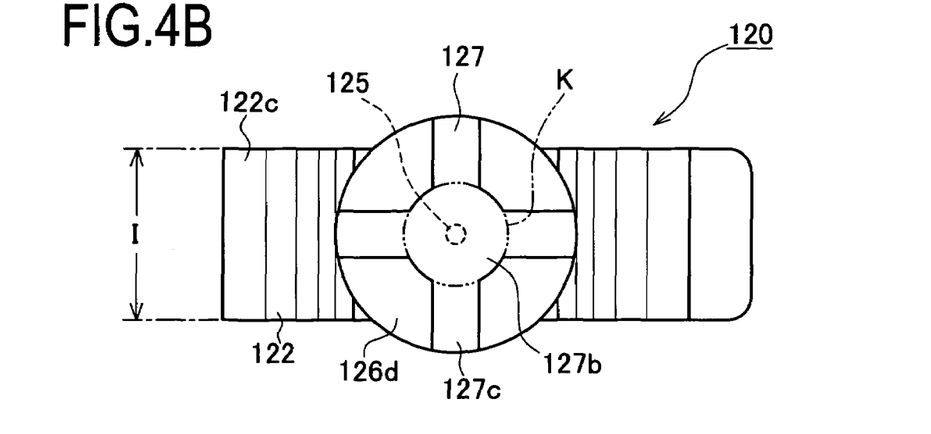
FIG. 4B is a bottom view of the temperature detector 120.

As shown in FIG. 4A, the surrounding body 126 has a cylinder hollow portion 126b which is substantially cylinder-hollow shaped and has plural through holes 126g around there, four protruding wall portions 126c which protrude radially outside of radius directions at the top end of the surrounding body 126, and four ribs 126d which are substantially fan shaped and link the four protruding wall portions 126c to periphery direction of the cylinder hollow portion 126b. Furthermore, as shown in FIG. 4B, at its front end (bottom end in the figure), the surrounding body 126 has a contact surface 127 which contacts with a surface of a battery case 111. The contact surface 127 has a circular temperature detecting region 127b, four protruding wall regions 127c which extend radially outside of radius directions from the temperature detecting region 127b. As shown in FIG. 4A and FIG. 4B, the temperature detecting region 127b includes a temperature detecting element 125 inside a virtual tube region K which is a virtual region corresponding to what the temperature detecting region 127b is extended to a direction orthogonal to the contact surface 127 (direction along the axial line C).

It is to be noted that a thermistor is used as temperature detecting element 125 for the temperature detector 120 of the present embodiment. Furthermore, the coating resin 124 and the cylinder hollow portion 126b of the surrounding body 126 correspond to a surrounding portion.

As shown in FIG. 4A, the fixing portion 122 has a pair of nail-shaped fixing-portion-side engaging portions 122c, and a pair of linking portions 122b which are curve-wise plate shapes curve-wise extending from the detector body 121 and link the fixing-portion-side engaging potions 122c and the detector body 121. The linking portions 122b have two curve portions 122d and 122e of which curve directions change suddenly. From the curve portions 122d and 122e, the linking portions 122b are elastically deformable in a direction orthogonal to the contact surface 127 of the detector body 121 (up-and-down direction, i.e., direction along the axial line C in the figure) and a direction that links the fixing-portion-side engaging potions 122c and the detector body 121 (direction along the figure sheet's surface direction) among directions along the contact surface 127. Furthermore, one of the pair of liking portions 122 has a plate-like remove-engaging portion 122f which extends in a direction orthogonal to the axial line C from the curve portion 122e so as to make its finger engage when the temperature detector 120 is removed.

As shown in FIG. 2, the temperature detectors 120 are arranged at three portions, namely, a bottom surface 111 c on a secondary battery 110A arranged at the most bottom among the secondary batteries 110 belonging to the battery module 101 in the figure, a bottom surface 111c on a secondary battery 110B arranged at the fourth place from the bottom in the battery module 103 in the figure, and a bottom surface 111c on a secondary battery 110C arranged at the most top in the battery module 106 in the figure. More specifically, as shown in FIG. 7 with a magnified way, the temperature detector 120 makes the fixing-portion-side engaging portion 122c engage with the step portions 132d of the supporting-member-side engaging portions 132 and also makes the contact surface 127 with the bottom surface 111c (temperature-detected surface) of the battery case 111, whereby the temperature detector 120 is fixed to a secondary battery 110.

By the way, with respect to the temperature detector 120, fixed-and-engaged surfaces 122g in contact with the step portions 132d of the supporting-member-side engaging portion 132 for the fixing-portion-side engaging portion 122c slants with reference to the contact surface 127 under free state as shown in FIG. 4A. On the other hand, stepped-and-engaged surfaces 132g in contact with the fixed-and-engaged surfaces 122g for the step portions 132d of the supporting-member-side engaging portion 132 is parallel to the bottom surface 111c of the battery case 111 with the supporting members 130 being fixed to the secondary batteries 110. Furthermore, when distance between a reference end 122h of the fixed-and-engaged surface 122g and the contact surface 127 in a direction along the axial line C is defined as D and distance between the stepped-and-engaged surface 132g of the supporting-member-side engaging portion 132 and the bottom surface 111c of the battery case 111 is defined as E (see FIG. 7), relation E<D is satisfied.

Figure 7:
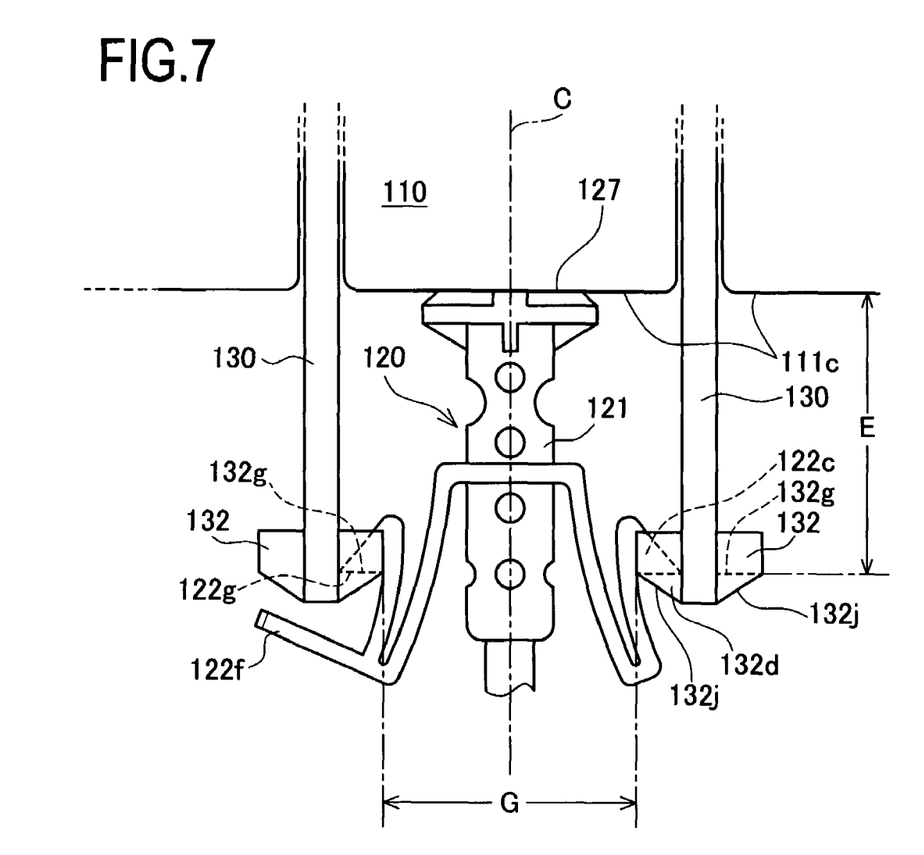
FIG. 7 is a magnified view showing a main portion of the secondary battery structure 100 directed to the present embodiment.

Therefore, as shown in FIG. 7, when the fixed-and-engaged surfaces 122g of the fixing-portion-side engaging portions 122c are made to contact with the stepped-and-engaged surfaces 132g of the supporting-member-side engaging portions 132 and the contact surface 127 is made to contact with the bottom surface 111c (temperature-detected surface) of the battery case 111, the linking portion 122b elastically deforms in a direction orthogonal to the bottom surface 111c (temperature-detected surface) of the battery case 111 (up-and-down direction in the figure). Therefore, the temperature detector 120 elastically presses the bottom surface 111c (temperature-detected surface) of the battery case 111 at the contact surface 127 with the aid of elastic memory of the linking portion 122b.

Furthermore, when space between the reference ends 122h of the pair of the fixed-and-engaged surfaces 122g is defined as F (see FIG. 4A) and space between facing two stepped-and-engaged surfaces 132g of adjoining supporting members 130 is defined as G (see FIG. 7), relation G<F is satisfied.

Therefore, as shown in FIG. 7, when the fixing-portion-side engaging portion 122c of the temperature detector 120 is made to engage with the supporting-member-side engaging portion 132 of the supporting member 130, the pair of linking portions 122 elastically deform in a direction orthogonal to the central axis C. Since the pair of fixing portions 122 press the supporting-member-side engaging portion 132 and are fixed thereto with the aid of the elastic memory of the pair of linking portions 122b, the temperature detector 120 can be positioned in thickness direction of the secondary battery 110 (left-and-right direction in FIG. 7).

Furthermore, when space between a pair of flat plate portions 132c which constitute the supporting-member-side engaging portion 132 is defined as H (see FIG. 6B) and width size of the fixing-portion-side engaging portion 122c of the temperature detector 120 is defined as I (see FIG. 4B), H is slightly larger than I. Therefore, as shown in FIG. 7, when the fixing-portion-side engaging portion 122c of the temperature detector 120 is made to engage with the supporting-member-side engaging portion 132 of the supporting member 130, the fixing-portion-side engaging portion 122c is sandwiched by the pair of flat plate portions 132c. Thereby, the temperature detector 120 can be positioned in width direction of the secondary battery 110 (direction orthogonal to the figure sheet's surface in FIG. 7).

As described in the above, in the secondary battery structure 100 of the present embodiment, the contact surface 127 of the temperature detector 120 is made to contact with the bottom surface 111c (temperature-detected surface) of the battery case 111 appropriately, and this contact state can be held.

Furthermore, with such structure, even though there arises relative location departure among the secondary battery 110, supporting members 130, 140, 150 and temperature detector 120 due to metrication error of respective members and the like, location departure can be absorbed thanks to elastic deformation of the linking portion 122b of the temperature detector 120. More specifically, for example, even if there arises metrication error between the bottom surface 111c (temperature-detected surface) of the battery case 111 and the supporting-member-side engaging portion 132 (step portion 132d) of the supporting member 130 (up-and-down distance in FIG. 7) due to metrication error of the supporting member 130, the linking portion 122b of the temperature detector 120 elastically deforms in direction orthogonal to the bottom surface 111c (temperature-detected surface) of the battery case 111 (up-and-down direction in FIG. 7). Thereby, the contact surface 127 of the temperature detector 120 can be made to contact with the bottom surface 111c (temperature-detected surface) of the battery case 111 appropriately while the fixing-portion-side engaging portion 122c is made to engage with the step portion 132d of the supporting-member-side engaging portion 132.

Furthermore, even if there arises metrication error between the fixing-portion-side engaging portion 122c and the detector body 121 (left-and-right directional distance in FIG. 7) due to metrication error of the temperature detector 120, the linking portion 122b of the temperature detector 120 elastically deforms in direction that connects the fixing-portion-side engaging portion 122c and the detector body 121 (left-and-right direction in FIG. 7). Thereby, the contact surface 127 of the temperature detector 120 can be made to contact with the bottom surface 111c (temperature-detected surface) of the battery case 111 appropriately while the fixing-portion-side engaging portion 122c is made to engage with the step portion 132d of the supporting-member-side engaging portion 132.

Furthermore, under the condition that the secondary battery structure 100 is likely to have vibration (in case used as power for electric cars and hybrid cars), the secondary batteries 110 are likely to vibrate in a direction orthogonal to the bottom surface 111c (temperature-detected surface) of the battery case 111 (up-and-down direction in FIG. 7). However, even under such condition, the secondary battery structure 100 can keep the contact surface 127 of the temperature detector 120 contacting with the bottom surface 111c (temperature-detected surface) on the battery case 111. Therefore, even under the likely-to-vibrate condition, surface temperature of the bottom surface 111c (temperature-detected surface) on the battery case 111 can be detected appropriately.

Furthermore, the temperature detector 120 is fixed to the supporting member 130 by pressing force that the fixing-portion-side engaging portion 122c presses the step portion 132d of the supporting-member-side engaging portion 132 downward in FIG. 7. Furthermore, the detector body 121 is fixed to the secondary battery 110 at the contact surface 127 by pressing force that presses the bottom surface 111c (temperature-detected surface) of the battery case 111 upward in FIG. 7. Accordingly, the detector body 120 is removably fixed to the secondary battery 110 and the supporting member 130.

For example, in case a dead secondary battery 110 is to be disposed, a temperature detector 120 can be removed from the dead secondary battery 110. Therefore, the temperature detector 120 is never disposed together with the dead secondary battery 110 and can be reused for a newly replaced secondary battery 110. Furthermore, maintenance operation can go preferably by removing the temperature detector 120.

Figure 8:
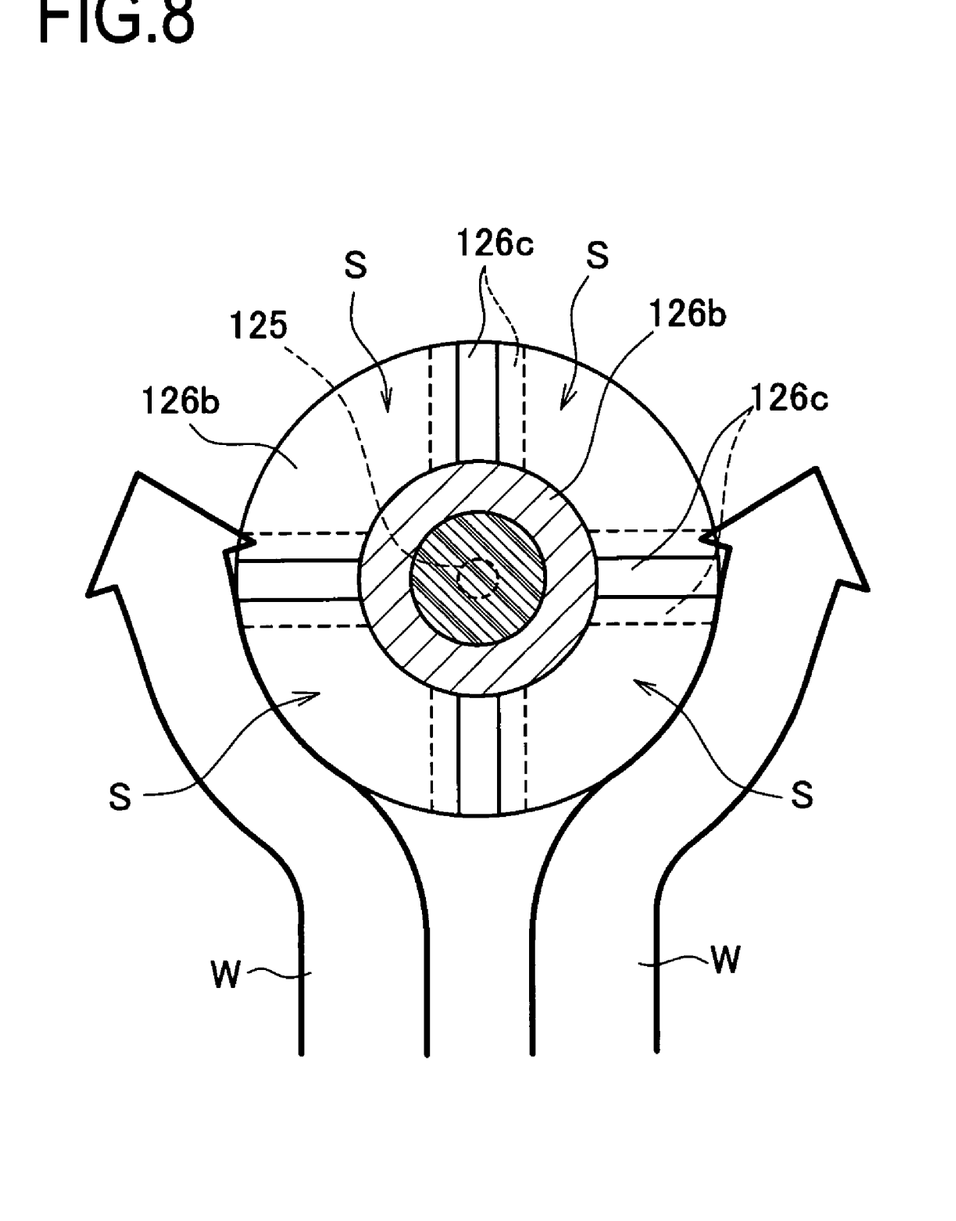
FIG. 8 is a cross-sectional view of an arrow B-B section shown in FIG. 4A.

Furthermore, as shown in FIG. 8, the temperature detector 120 has coating resin 124, a cylinder hollow portion 126b for a surrounding body 126, and four protruding wall portions 126c which protrude radially outside of diameter direction from the cylinder hollow portion 126b, around the temperature detecting element 125. With such structure, in case cooling wind W is sent to the secondary battery structure 100 for cooling down a secondary battery 110, the four protruding wall portions 126c can prevent cooling wind W from circulating to surface of the cylinder hollow portion 126b. More specifically, when cooling wind W is sent, air stagnation is created at a space S surrounded with the cylinder hollow portion 126b of the surrounding body 126 and the four protruding wall portions 126c. Therefore, approach of cooling wind W to the temperature detecting element 125 can be avoided as effectively as the case that thickness of the cylinder hollow portion 126b of the surrounding body 126 is made as thick as thickness inclusive of the four protruding wall portions 126c with respect to the surrounding of the temperature detecting element 125 (in case thickness of the cylinder hollow portion 126b is made as thick as coinciding with outer diameter of a rib 126d in FIG. 8). Therefore, the temperature detecting element 125 is not cooled down by cooling wind W.

Furthermore, since volume of the surrounding portion (the portion surrounding the temperature detecting element 125 of the detector body 121) can be made small in comparison with the case thickness of the cylinder hollow portion 126b is made thick as described in the above, calorific capacity of the surrounding portion can be made small. Therefore, there never occurs a problem that calorific capacity of the surrounding portion becomes too large to transmit temperature of the bottom surface 111c (temperature-detected surface) on the battery case 111 to the temperature detecting element 125 rapidly.

As described in the above, since the secondary battery structure 100 employs the temperature detector 120 which has four protruding wall portions 126c extending radially outside of diameter direction from the cylinder hollow portion 126b, temperature of the bottom surface 111c (temperature-detected surface) on the secondary battery 110 can be detected appropriately and immediately.

Furthermore, as described in the above, the temperature detector 120 has the contact surface 127 consisting of the circular temperature detecting region 127b and four protruding regions 127c which radially protrude and extend from the temperature detecting region 127b (see FIG. 4B). Even though force to make the temperature detector 120 slant works, above such structure can lessen the force in at least four directions where the protruding region 127c extends radially. Therefore, ground stability can be improved and the temperature detecting region 127b can be made to contact with the bottom surface 111c (temperature-detected surface) on the battery case 111 stably. Especially, since the protruding region 127c radially extends in four directions with equally spaced with respect to periphery direction of the temperature detecting region 127b, the temperature detector 120 is hard to slant in any directions and ground stability is quite preferable.

Furthermore, since the contact area can be made smaller in comparison with a case that a ring region for surrounding entire periphery of the temperature detecting region 127b is provided (diameter of a temperature detecting region is made larger to coincide with outer diameter of the rib 126d in FIG. 4B) so as to make ground stability of the temperature detector 120 preferable, ground pressure of the temperature detecting region can be made larger even if same pressure force is applied. Therefore, the temperature detector 120 can make the temperature detecting region 127b contact with the bottom surface 111c on the battery case 111 appropriately in the inventive secondary battery structure with the aid of elastic memory of the linking portion 122.

It is to be noted that the temperature detector 120 can be attached (fixed to the supporting member 130 and the secondary battery 110) appropriately by simply plunging upward from below of the bottom surface 111c on the battery case 111 at the position of the supporting member 130. More specifically, the remove-engaging portion 122f is pressed upward in FIG. 7 with fingers, and an outside surface 122j of the fixing-portion-side engaging potions 122c is moved upward along a slant surface 132j of the supporting-member-side engaging portion 132. Thereby, the temperature detector 120 moves upward in the figure and the pair of linking portions 122 elastically deforms to the side of the central axis C.

When the outside surface 122j of the fixing-portion-side engaging potions 122c passes through the slant surface 132j of the supporting-member-side engaging portion 132, the pair of linking portions 122 elastically deform (recovers to the original form) in a direction going away from the central axis C. At this stage, as shown in FIG. 7, the contact surface 127 of the temperature detector 120 comes to contact with the bottom surface 111c on the battery case 111 and the fixing-portion-side engaging potions 122c gets engaged with the supporting-member-side engaging portion 132, whereby the temperature detector 120 can be fixed to the supporting member 130 and the secondary battery 110. Furthermore, vice versa, the temperature detector 120 can be removed from the supporting member 130 and the secondary battery 110 easily with the aid of the remove-engaging portion 122f.

While the presently preferred embodiment of the present invention has been shown and described, it is to be understood that this disclosure is for the purpose of illustration and that various changes and modifications may be made without departing from the scope of the invention as set forth in the appended claims.

For example, the secondary battery structure 100 of the present embodiment is structured such that six sets of eight secondary batteries 110 connected in series constitute the battery modules 101 through 106 and those battery modules are connected in series to organize a battery pack, however gathering manner and number of secondary batteries is not restricted to the above. A unit cell may be applicable.

Furthermore, in the secondary battery structure 100 of the present embodiment, the temperature detectors 120 detect temperature of bottom surfaces 111 $c$ on the battery cases 111 with respect to three of the forty-eight secondary batteries 110 shown in FIG. 2. However, secondary batteries 110 subject to temperature detection may be randomly selected depending on use state of the secondary battery structure 100 and the like or temperature of all secondary batteries 110 may be detected.

Furthermore, in the secondary battery structure 100 of the present embodiment, a temperature detector 120 is provided for a secondary battery 110, however, plural temperature detectors 120 may be provided for a secondary battery 110 so that temperature can be detected at plural portions on a single secondary battery 110.

Furthermore, in the secondary battery structure 100 of the present embodiment, a rectangular-sealed-type nickel hydride secondary battery is used as a secondary battery, however, shape of it is not restricted to rectangular. Any forms may be applicable. Also, it is not restricted to nickel hydride secondary battery but any types may be applicable.

What is claimed is:

1. Secondary battery structure comprising:
   a secondary battery with a metallic battery case having side surfaces, and a bottom surface;
   a temperature detector for detecting temperature of the secondary battery; and
   a supporting, structure supporting the temperature detector and having positioning portions positioning secondary batteries, said supporting structure being separate from the battery case, and external to at least one surface of the battery case;
   wherein the temperature detector includes:
   a detector body for detecting surface temperature of the battery case by contacting with a temperature-detected surface of the battery case; and
   a fixing portion for fixing the temperature detector to the secondary battery, the fixing portion engaging with the supporting member to keep the detector body in contact with the temperature-detected surface.

2. Secondary battery structure according to claim 1, wherein the fixing portion of the temperature detector is elastically deformable, and the detector body elastically contacts and presses a surface of the battery case with aid of elastic memory of the fixing portion which engages with the supporting member in a elastically deformed state.

3. Secondary battery structure according to claim 2,
   wherein the supporting member has a supporting-member-side engaging portion which engages with the fixing portion of the temperature detector, and
   the fixing portion of the temperature detector includes:
   a fixing-portion-side engaging portion which engages with the supporting-member-side engaging portion; and
   a linking portion which links the fixing-portion-side engaging portion and the detector body, and is elastically deformable in at least two directions, namely, a direction orthogonal to the temperature-detected surface of the battery case, and a direction that links the fixing-portion-side engaging portion and the detector body among directions along the temperature-detected surface.

4. Secondary battery structure according to claim 1, wherein the temperature detector engages with the supporting member at the fixing portion while being removable from the supporting member and the secondary battery.

5. Secondary battery structure according to claim 1, wherein the detector body of the temperature detector includes:
   a temperature detecting element for detecting temperature;
   a surrounding portion for surrounding the temperature detecting element, the surrounding portion being pillar shaped; and
   plural protruding wall portions for preventing air from circulating along a surface of the surrounding portion, the protruding wall portions protruding radially from the surrounding portion to outward.

6. Secondary battery structure according to claim 1,
   wherein the detector body of the temperature detector has a contact surface which contacts the temperature-detected surface of the battery case, and
   the contact surface includes:
   a temperature detecting region inclusive of the temperature detecting element inside of a virtual tube region which corresponds to what the temperature detecting region is extended in a direction orthogonal to the contact surface; and
   plural protruding regions which protrude and extend radially from the temperature detecting region.

* * * * *